United States Patent [19]

Gilbert

[11] Patent Number: 4,483,391
[45] Date of Patent: Nov. 20, 1984

[54] AIR PREHEATER

[76] Inventor: Keith W. Gilbert, "Wynton", Rectory Rd., Padworth Common, Berkshire, England

[21] Appl. No.: 338,727

[22] Filed: Jan. 11, 1982

[30] Foreign Application Priority Data

Jan. 9, 1981 [GB] United Kingdom ............... 8100656

[51] Int. Cl.³ .................. F28F 19/00; F28F 13/06
[52] U.S. Cl. ............................ 165/134 DP; 165/108
[58] Field of Search .......... 237/55; 165/103, 134 DP, 165/DIG. 2, DIG. 28, 108; 126/99 R; 122/1 A, 20 B

[56] References Cited

U.S. PATENT DOCUMENTS

| | | | |
|---|---|---|---|
| 2,333,602 | 11/1943 | Van Almelo | 237/55 |
| 2,524,843 | 10/1950 | Slefer et al. | 237/55 |
| 2,947,522 | 8/1960 | Keller | 165/103 |
| 3,913,663 | 10/1975 | Gates | 165/DIG. 2 |
| 4,243,096 | 1/1981 | Lipets et al. | 165/134 DP |
| 4,305,455 | 12/1981 | Lipets et al. | 165/134 R |

Primary Examiner—William R. Cline
Assistant Examiner—Edward P. Walker
Attorney, Agent, or Firm—Marvin A. Naigur; John E. Wilson

[57] ABSTRACT

The invention relates to air preheaters and discloses a preheater in which the air is heated in two stages of heat exchange, the heat source being flue gases. Air to be heated is passed along a path having two portions. Air in the second portion is in heat exchange relation with the flue gases and air in the first portion is in heat exchange relation with air in the second portion. By this means, direct heat exchange between flue gases and cold air is avoided, with the consequent reduction in the risk of condensation of harmful fluids from the flue gases. The respective portions of the air flow path are normally one within the other, enabling the conduit defining the inner portion to be removed without interfering with the flue gas ducting.

8 Claims, 3 Drawing Figures

AIR PREHEATER

BACKGROUND TO THE INVENTION

This invention relates to an air preheater for a fired burner suitable for use with a furnace boiler.

Combustion efficiency on a fired burner can be increased by preheating the combustion air prior to its introduction to the burner. This can be achieved by utilizing the available heat from the flue gases in heat exchange with the incoming air. A simple cross-flow heat exchanger can give rise to condensation problems at the cold end where corrosive fluids may condense from the flue gases. The present invention seeks to provide an air preheater system which reduces the risk of these problems developing.

SUMMARY OF THE INVENTION

According to the present invention, an air preheater comprises an outer casing and an inner casing defining a path for the passage of flue gases around the inner casing; and a central duct passing into the inner casing, the duct and the inner casing defining a path for air to be preheated which extends through the duct in one direction and between the duct and the inner casing in the opposite direction. In use the incoming air is preheated first by heat exchange with the heated air and then by heat exchange with the flue gases. Thus, direct heat exchange between the flue gases and unheated air is avoided, thereby reducing the risk of corrosion by condensation of harmful (acidic) fluids from the flue gases. Further, as the central duct need be no part of the flue gas ducting, it may be easily replaced as necessary. The central duct can be subject to corrosion due to the potential sulphur content of the incoming air.

In one simple embodiment of the invention, the inner casing is mounted within the outer casing, and closed at one end. The central duct passes into the inner casing, terminating short of the closed end to define both directions of the air flow path within the inner casing. The flow of air turns through 180° at the closed end and passes back over the outer surface of the central duct before being fed to the burner. In this second stage the heated air heats the incoming cold air while simultaneously taking up heat from the flue gases between the inner and the outer casing.

The invention may also be embodied in a larger system in which the outer casing is the main exhaust gas conduit from the burner. In this embodiment, inner casings define a plurality of passageways across the exhaust conduit for heated air. A central duct passes through each such passageway carrying cold air in heat exchanging relationship with the heated air. The partially heated air from each central duct is then recycled through the passageways. If desired, the partially heated air may be further heated, either before or after being used to preheat the cold air, by being passed in direct heat exchange relationship with the flue gases in the exhaust conduit. This may be accomplished by the use of tubes traversing the exhaust conduit in one or more passes, either upstream or downstream of the inner casings in the conduit. A forced draught fan may be interposed between the central ducts and such tubes to recycle partially heated air from the central ducts to the passageways.

The air preheater of the invention can also fulfil a secondary function. The forced draught fan used to deliver air to the burner normally requires a silencer for the incoming air and the preheater can perform this function also. Thus, the need for a separate intake silencer can be eliminated.

To enhance the heat exchange in the preheater, the inner casing will normally be provided with fins on at least one, and preferably both of the internal and external sides. The invention allows maximum design flexibility and in many instances, enables the preheater to be used as a natural extension of a convection bank in for example, a furnace boiler. Additional ducting for the flue gases can thus be minimized and the need for an induced draught fan for the flue gases can also be obviated as only a minimal pressure drop is caused by the preheater.

The invention is now illustrated in the accompanying drawings.

DESCRIPTION OF PREFERRED EMBODIMENTS

Figure 1:
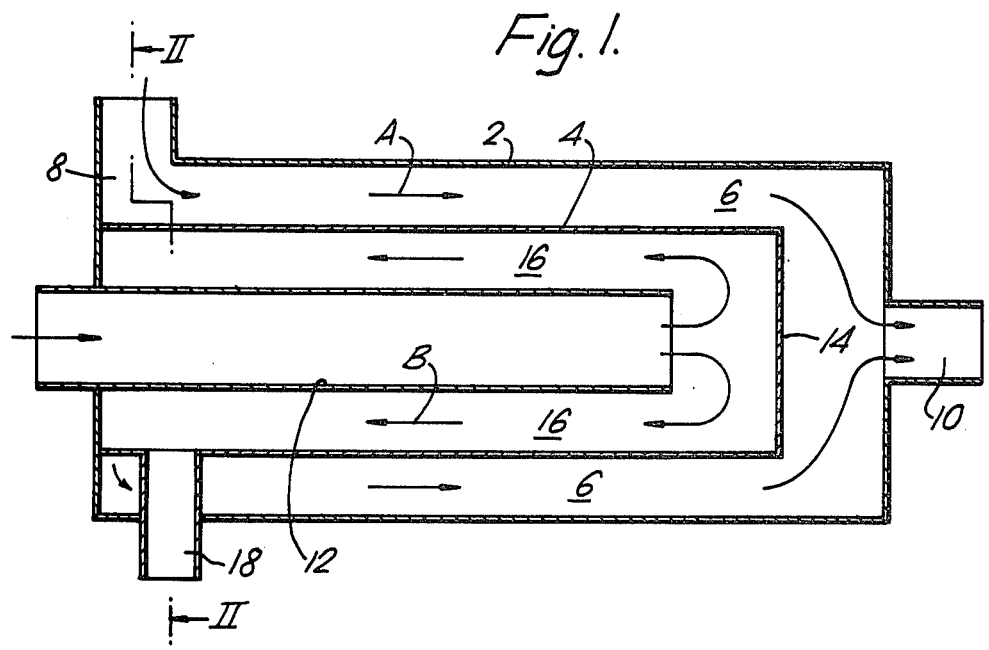
FIG. 1 is a longitudinal diagrammatic cross-section through an air preheater according to the invention.
Figure 2:
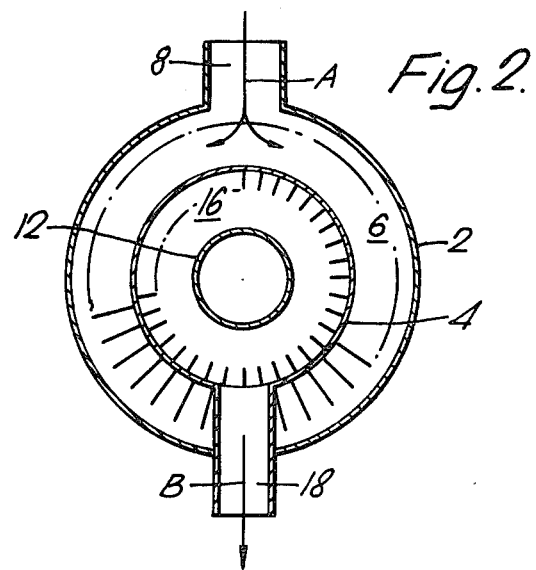
FIG. 2 is a sectional view taken on the line II—II of FIG. 1.

The preheater illustrated in FIGS. 1 and 2 comprises a cylindrical outer casing 2 and a cylindrical inner casing 4 which together define a path 6 for flue gases of annular cross-section between an inlet 8 and an outlet 10. A central duct 12 passes into the inner casing 4 but terminates short of the closed end 14 of the inner casing 4. In use, flue gas passes along the path 6 as shown by the arrows A and gives up heat to air confined within the inner casing 4. Cold air is fed into the central duct 12, is turned through 180° at the closed end 14 of the inner casing 4, and then passes through the space 16 between the duct 12 and the inner casing 4 to an outlet 18 as shown by arrows B from which it is fed to a burner (not shown).

It will be appreciated that in operation, the cold air is heated in two stages by the flue gases, but that there is no direct heat exchange between the unheated air and the flue gases. Only air in the space 16 is in direct heat exchange with the flue gases, the incoming air being heated by the already heated air in the second stage (in the space 16).

In order to enhance the heat transfer across the inner casing 4, fins are provided on both its internal and external surfaces as shown in FIG. 2. Fins may also be provided on the central duct 12 but we have found this not to be necessary and indeed in some respects undesirable as excessive cooling of the air prior to its passage through outlet 18 is to be avoided. The finning of the inner casing 4 and where appropriate, the central duct 12 can be varied to suit particular requirements. It can in some instances be advantageous to vary the extent of finning along the length of the unit to increase the heat transfer area in certain regions.

Figure 3:
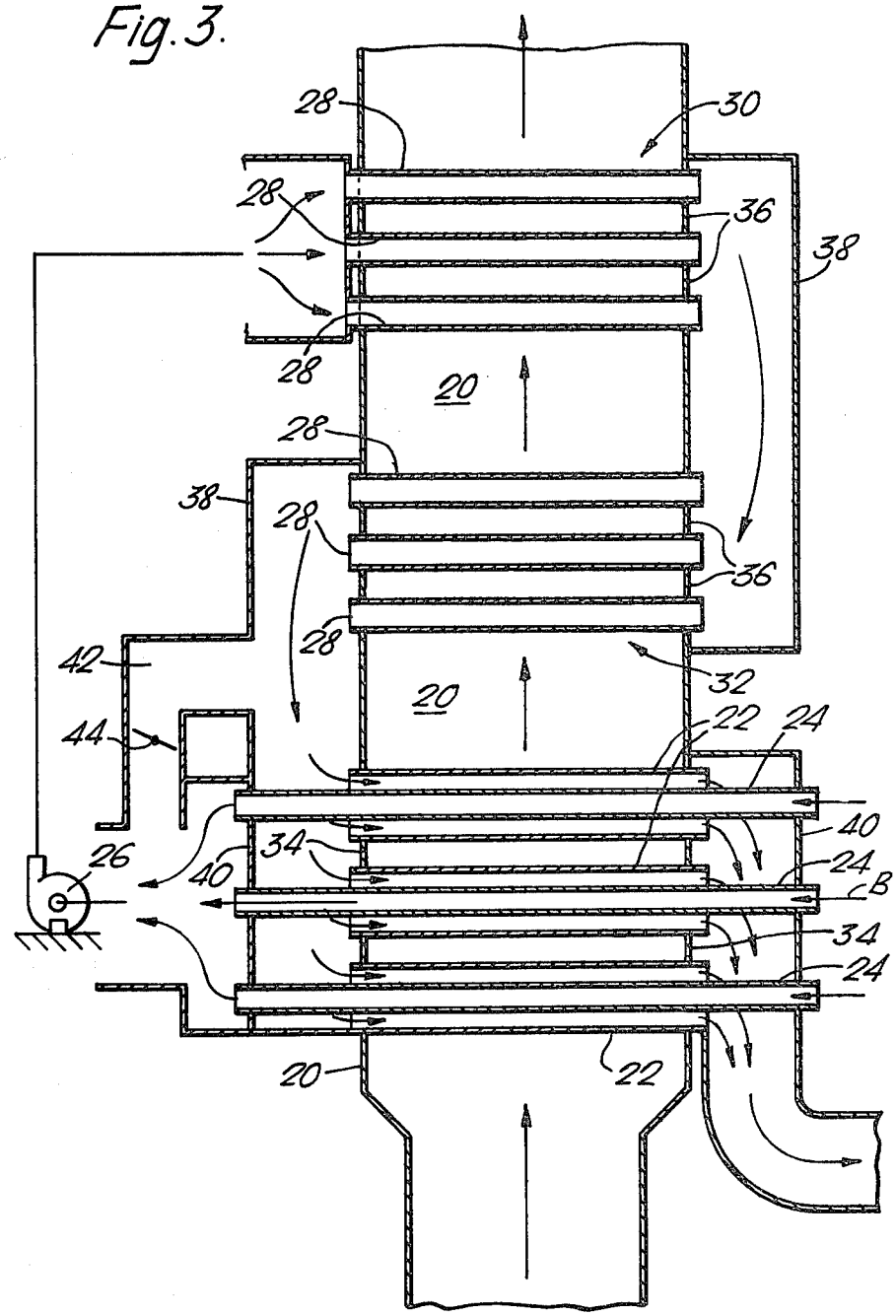
FIG. 3 is a schematic cross-sectional representation of a flue gas exhaust conduit incorporating the invention.

The system illustrated in FIG. 3 is incorporated in a flue gas exhaust conduit 20 from a burner (not shown). Again, arrows A indicate the flow path for the flue gases, and arrows B that of the air to be preheated. The exhaust conduit 20 corresponds to the outer casing 2 of FIG. 1 and the "inner casing" takes the form of a plurality of passageways 22 which extend across the duct 20. A duct 24 is located centrally in each passageway 22 and cold air is passed through the ducts 24 and recycled through the passageways 22 externally of the ducts 24 by a fan 26. Only the recycled air is in direct heat exchange with the flue gas in the conduit 20; the incoming cold air being heated by the recycled air.

In the illustrated system, partially heated air from the ducts 24 is subject to additional heating from the flue gas in conduit 20 before reaching the passageways 22. It is fed through tubes 28 which traverse the conduit 20 in two passes at 30 and 32, downstream of the passageways 22 in the conduit 20. In some circumstances, this additional heating may be applied after passing through passageways 22 and/or upstream of the passageways 22 to achieve different final temperatures of the air and flue gases. In an arrangement of the kind illustrated, flue gas at around 850° F. can be effectively cooled to around 350° F. while heating air from around 0° F. to around 650° F. As with the embodiment of FIGS. 1 and 2 the inner and/or outer surfaces of the passageways 22 and/or tubes 28 may be provided with fins to enhance heat transfer thereacross.

The construction of the system of FIG. 3 is straightforward and will not be described in detail. The passageways 22 are mounted directly in the wall of the exhaust conduit 20 in spreader plates 34; and the tubes 28 likewise in plates 36. The path of the recycled air is defined by ductwork 38 which is bounded on one side by the exhaust conduit 20, and the ducts 24 are mounted directly in the walls 40 of the ductwork 38 as indicated. Thus, in both the embodiments illustrated, the ducts 12 and 24 can be replaced with minimum dismantling of the unit and in neither case requiring the flue gas flow path to be disrupted. The fact that the flue gas flow path is substantially uninterrupted can obviate any requirement for an induced draught flue gas fan as the pressure drop across the preheater system is minimal. At the same time, the flow path for the incoming air is such as to reduce or eliminate the need for a silencer, further minimizing capital expenditure.

The actual performance of an air preheater made in accordance with the invention will depend upon a number of factors, the most significant of which is the ambient temperature of the air to be preheated. When this temperature is very low, of the order of −20 degrees Centrigrade the first preheating stage can fail to raise the temperature sufficiently to avoid condensation in the flue gases in the second stage. To avoid this fully or partially preheated air can be bled from downstream of the second stage to mix with air issuing from the first stage as shown in FIG. 3 at 42, thereby increasing its inlet temperature at the second stage. A damper 44 is used to control the amount of air recycled.

The temperature of the heat transfer surface in contact with the flue gases in the second stage of preheating must be maintained above the acid dew point if the condensation of acidic fluids from the flue gases is to be avoided. The condensation of sulphur dioxide to form sulphuric acid will attack and cause rapid and serious corrosion of steel exhaust conduit sections. To minimize or avoid formation of sulphuric acid the temperature of the inner casing 4 (FIG. 1) or tubes 28 (FIG. 3) should be maintained above about 150 degrees centrigrade along their entire lengths. The extent to which fins are used to enhance the heat transfer in this stage is therefore critical as even though at the upstream end acceptable temperatures are maintained, too much heat transfer can result in the temperature at the downstream end being dangerously low. To avoid this, the second preheating stage can itself be controlled by varying the degree to which fins are employed, and thereby the heat transfer efficiency along the length of the stage. In the embodiment of FIG. 3, this is accomplished by including fins on the internal surface of tubes 28 in the first pass 30 only along a downstream portion of their length. The external surface of the tubes can be finned along their entire length so that the heat transfer from the flue gases to the tubes is maintained but internally, substantially the first half of each tube length is left unfinned to reduce the heat loss from the tube to the air. The second half is finned to increase the total heat transfer but without causing excessive cooling of the tubes 28. The precise internal length of the tube left unfinned can of course be varied depending upon the operating criteria of the burner to which the preheater is to be applied.

The relative dimensions of the separately defined flow paths can also affect the performance of the preheater, and a preferred arrangement is one in which contiguous portions of the first and second stage have cross-sections in the ratio of about 1:3. This can be achieved with a diameter ratio of about 1:2. For example in the embodiment of FIG. 3, the diameter of tubes 24 might be about 10 cms, that of tubes 22 about 19 cms, and that of tubes 28 about 12.5 cms.

Variations from the embodiments specifically illustrated may be made without departing from the spirit and scope of the invention. For example, the direction of flow of preheated air in heat exchange both with the flue gases and with the incoming unheated air can be the same as that of the incoming air; i.e., opposite to that shown in FIG. 3. This can be advantageous as it reduces the temperature difference across the preheated air stream and maximizes heat transfer thereto prior to discharge.

I claim:

1. An air preheater comprising an outer casing defining a path for the passage of flue gases; a plurality of inner casings each defining a passageway through the outer casing and being positioned within the outer casing; a plurality of central ducts each passing through an inner casing; the ducts and inner casings each adapted to contain air to be preheated flowing first through a duct in one direction and thereafter between the duct and its associated inner casing in the opposite direction; a plurality of tubes extending through the outer casing for preheating air after passage through said central ducts; means for passing air to be preheated first through the central ducts and thereafter between the ducts and the respective inner casings whereby air in said central ducts is in heat exchange relation with air between the central ducts and inner casings which air is in heat exchange relation with flue gases in the outer casing.

2. An air preheater according to claim 1 wherein said tubes contain flowing air to be preheated after it has passed through said duct and before it passes between said duct and said inner casing.

3. An air preheater according to claim 1 wherein said tubes form a part of the path for air to be preheated downstream of its passage between said duct and said inner casing.

4. An air preheater according to claim 1 wherein the inner casings traverse the path for the passage of flue gases defined by the outer casing.

5. An air preheater according to claim 1 including a forced draught fan for recycling partially preheated air from the central ducts for subsequent preheating.

6. An air preheater comprising an outer casing defining a path for the passage of flue gases; a plurality of inner casings traversing the path defined by the outer casing; first and second plenum chambers mounted on opposite sides of the outer casing in communication with the ends of the inner casings; a plurality of ducts extending between outer walls of the plenum chambers, each duct passing within an inner casing, for receiving unheated air at the outer wall of the first plenum chamber; and fan means for recycling air from the ducts to the second plenum chamber for passage within the inner casings but external of the ducts passing therethrough to the first plenum chamber for discharge therefrom, air in the ducts being in heat exchange relation with recycled air within the inner casings but external of the ducts, such recycled air also being in heat exchange relation with flue gases in the outer casing.

7. An air preheater according to claim 6 including a third plenum chamber mounted on the outer casing opposite the second chamber; and a plurality of tubes traversing the outer casing between the third and second plenum chambers in heat exchange relation with flue gases in the outer casing, the fan means recycling air from the ducts to the third chamber for passage to the second chamber and thence to the inner casings.

8. An air preheater according to claim 7 including an auxiliary duct between the second plenum chamber and the inlet to the fan means, and damper means in the auxiliary duct for providing a controlled flow of preheated air to raise the temperature of the air between the ducts and the third plenum chamber.

* * * * *